US010054941B1

United States Patent
Beard

(12) United States Patent
(10) Patent No.: US 10,054,941 B1
(45) Date of Patent: Aug. 21, 2018

(54) SYSTEMS AND METHODS FOR REGULATING THE LOCATION OF AN UNMANNED AERIAL SYSTEM (UAS)

(71) Applicant: uAvionix Corporation, Omaha, NE (US)

(72) Inventor: Paul Beard, Bigfork, MT (US)

(73) Assignee: uAvionix Corporation, Bigfork, MT (US)

( * ) Notice: Subject to any disclaimer, the term of this patent is extended or adjusted under 35 U.S.C. 154(b) by 3 days.

(21) Appl. No.: 15/290,790

(22) Filed: Oct. 11, 2016

Related U.S. Application Data

(60) Provisional application No. 62/395,900, filed on Sep. 16, 2016, provisional application No. 62/384,007, filed on Sep. 6, 2016, provisional application No. 62/242,082, filed on Oct. 15, 2015, provisional application No. 62/242,182, filed on Oct. 15, 2015, provisional application No. 62/239,016, filed on Oct. 8, 2015.

(51) Int. Cl.
*G05D 1/00* (2006.01)
*G05D 1/02* (2006.01)

(52) U.S. Cl.
CPC ......... *G05D 1/0055* (2013.01); *G05D 1/0202* (2013.01)

(58) Field of Classification Search
CPC ........................... G05D 1/0055; G05D 1/0202
USPC ............................................................ 701/3
See application file for complete search history.

(56) References Cited

U.S. PATENT DOCUMENTS

| | | | |
|---|---|---|---|
| 8,368,584 B2 | 2/2013 | Askelson et al. | |
| 8,373,591 B2 | 2/2013 | Margolin | |
| 8,378,881 B2 | 2/2013 | LeMire et al. | |
| 8,380,367 B2 | 2/2013 | Schultz et al. | |
| 8,386,175 B2 | 2/2013 | Limbaugh et al. | |
| 9,129,520 B2 | 9/2015 | Limbaugh et al. | |
| 9,274,521 B1 * | 3/2016 | Stefani ................. | G08G 5/0026 |
| 2014/0324255 A1 | 10/2014 | Siddiqi et al. | |
| 2015/0097714 A1 | 4/2015 | Margolin | |
| 2015/0260824 A1 | 9/2015 | Malveaux | |

* cited by examiner

*Primary Examiner* — Brian P Sweeney
(74) *Attorney, Agent, or Firm* — Suiter Swantz pc llo

(57) ABSTRACT

A system and related method for regulating the location of an unmanned aircraft system (UAS) determines the current position of the UAS via onboard sensors or via decoding and derivation of ADS-B signals received from other vehicles. The system may operate in inert mode, where the position of the UAS is not broadcast, or alert mode, where the position of the UAS is continually broadcast via ADS-B Out signal. Based on the position of the UAS, the system detects proximate vehicles, restricted airspaces, or other problem statuses of the UAS. If a problem status is detected, the UAS may activate the alert mode. If a problem status is critical, the UAS may execute an auto-landing or correct course to exit a restricted airspace or avoid a detected vehicle.

19 Claims, 5 Drawing Sheets

SYSTEMS AND METHODS FOR REGULATING THE LOCATION OF AN UNMANNED AERIAL SYSTEM (UAS)

CROSS-REFERENCE TO RELATED APPLICATIONS

This application claims priority under 35 U.S.C. § 119(e) to provisional U.S. Patent Application Ser. No. 62/239,016, filed Oct. 8, 2015; Ser. No. 62/242,082, filed Oct. 15, 2015; Ser. No. 62/242,182, filed Oct. 15, 2015; Ser. No. 62/384,007, filed Sep. 6, 2016; and Ser. No. 62/395,900, filed Sep. 16, 2016. Said provisional U.S. Patent Applications 62/239,016, 62/242,082, 62/242,182, 62/384,007, and 62/395,900 are herein incorporated by reference in their entirety.

TECHNICAL FIELD

The present disclosure is generally related to systems for the integration of unmanned aerial systems (UAS) into a shared airspace, and, in particular, to the utilization of ADS-B signals in a UAS guidance system.

BACKGROUND

The rapid proliferation of unmanned aerial systems (UAS, also unmanned aerial vehicles (UAV)) necessitates systems and methods suitable for the integration of such systems into shared airspace. One of the most critical challenges associated with the integration of small UAS into shared airspace is effective traffic management. The size and altitude of many UAS are such that traditional air traffic control systems such as surveillance radar are inappropriate. Additionally, requiring continuous human monitoring of every UAS is untenable, especially as the number of UAS increases. Automatic Dependent Surveillance-Broadcast (ADS-B) is an exemplary alternative next-generation surveillance technology in which ADS-B compliant vehicles determine their positions via high-integrity satellite navigation (e.g. GPS) and broadcast their positions, along with other relevant data, such that other vehicles and/or ground stations can receive the signals. In this way, the ADS-B system can work in tandem with other aircraft management systems such as collision avoidance systems (e.g., Traffic Collision and Avoidance Systems, or TCAS). In the United States, all aircraft operating in airspace classes A, B, C, and E will be required to be equipped with equipment to transmit ADS-B information in the form of ADS-B Out signals.

It is noted that surveillance technology such as ADS-B is not itself sufficient to integrate UAS into shared airspace. The particular performance metrics of a UAS (such as Size, Weight, and Power (SWaP) metrics) along with the lift-to-drag (L/D) ratio critically impact the mission restrictions of a UAS. In general, communications systems (including antennas, power supplies, and associated circuitry) negatively impact the performance metrics of a UAS. As such, the greater the transmission power required for a communication system (e.g. ADS-B Out), the greater the power requirements and thus the lower the performance metrics. Accordingly, there is a need to develop guidance systems and methods to balance traffic control requirements with UAS performance metrics.

It is further noted that the spectral capacity of any communications network is limited, and that efficient use of spectral capacity becomes increasingly important as the number of devices on the network increases. It is expected that continued advances in UAS technology will continually increase the number of UAS systems in operation, and thus continually increase pressure on communications networks (e.g. ADS-B) associated with guidance and traffic management of both manned and unmanned systems. As a consequence, in order to optimize spectral capacity and reduce interference, it may not be desirable for every aircraft within a shared airspace to maintain constant bi-directional communication. Rather, in some applications, it may be desirable to assign aircraft into segregated airspaces, which may be defined by geographical location (e.g. near an airport) or elevation. In this way, aircraft are assigned to an airspace category according to the mission and/or technological capabilities of the aircraft (including, but not limited to, communications capability or degree of maneuverability). In other applications, it may be desirable to employ traffic-control and/or sense-and-avoid (SAA) systems such that multiple types or classes of aircraft share a common airspace. Accordingly, there is a further need to develop UAS guidance systems and methods that minimize the impact on the spectral load of the communications network in which the UAS operate.

SUMMARY

Broadly speaking, embodiments of the inventive concepts disclosed herein are directed generally to systems and methods for integrating unmanned aerial systems (UAS) into shared airspace. In order to optimize the limited spectral capacity of communications networks, communications signals transmitted by the UAS may be received only by relevant aircraft or ground-based stations to avoid interfering with other civil and commercial aircraft. Should the UAS enter the airspace of the civil or commercial aircraft, the latter aircraft may receive communications signals from the UAS and thereby monitor its position.

In a first aspect, embodiments of the inventive concepts disclosed herein may be directed to a system for regulating the location of a UAS. The system may include processors for determining the current position of the UAS, and detecting possible problem states (e.g., improper altitude, improper airspace, proximate vehicles) based on the current position. The processors may, if a problem status is detected, activate an alert mode of the UAS. The processors may determine if the problem status is a critical problem status that warrants executing an auto-landing of the UAS. If the problem status is not critical, the processors may direct the UAS to maneuver to evade or avoid any vehicles detected proximate to the UAS. The system may include a transponder incorporating an antenna element and communication circuitry for generating position signals based on the current position of the UAS. The transponder may receive, via the antenna element, position signals transmitted by other nearby aircraft. When the alert mode is activated, the transponder may broadcast position signals indicating the current position of the UAS.

In a further aspect, embodiments of the inventive concepts disclosed herein are directed to a UAS. The UAS may include a control system for adjusting the position, heading, velocity, or orientation of the UAS. The UAS may include processors for determining the current position of the UAS. The processors may detect, based on the determined position, problem states of the UAS. The processors may, if a problem status is detected, activate an alert mode of the UAS. The processors may determine if the detected problem status is a critical problem status; if a critical status is detected, the processors may direct the control system to auto-land the UAS. If the problem status is not critical, the processors may direct the UAS to maneuver to evade or avoid any vehicles detected proximate to the UAS. The UAS may include a transponder incorporating an antenna element and communication circuitry for generating position signals based on the current position of the UAS. The transponder may receive, via the antenna element, position signals transmitted by other nearby aircraft. When the alert mode is activated, the transponder may broadcast position signals indicating the current position of the UAS.

In a still further aspect, embodiments of the inventive concepts disclosed herein may be directed to a method for regulating the location of a UAS. The method may include determining a current position of the UAS. The method may include detecting, based on the determined current position, a problem status of the UAS. The method may include, if the problem status is detected, activating an alert mode of the UAS whereby an onboard transponder broadcasts the current position of the UAS. The method may include determining if the detected problem status is a critical problem status. The method may include, if a critical problem status is detected, directing the control system of the UAS to auto-land the UAS. The method may include, if the alert mode of the UAS is activated but no critical problem status is determined, directing the control system to maneuver the UAV to avoid any detected vehicles or improper locations.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION OF EXEMPLARY EMBODIMENTS

Figure 1:
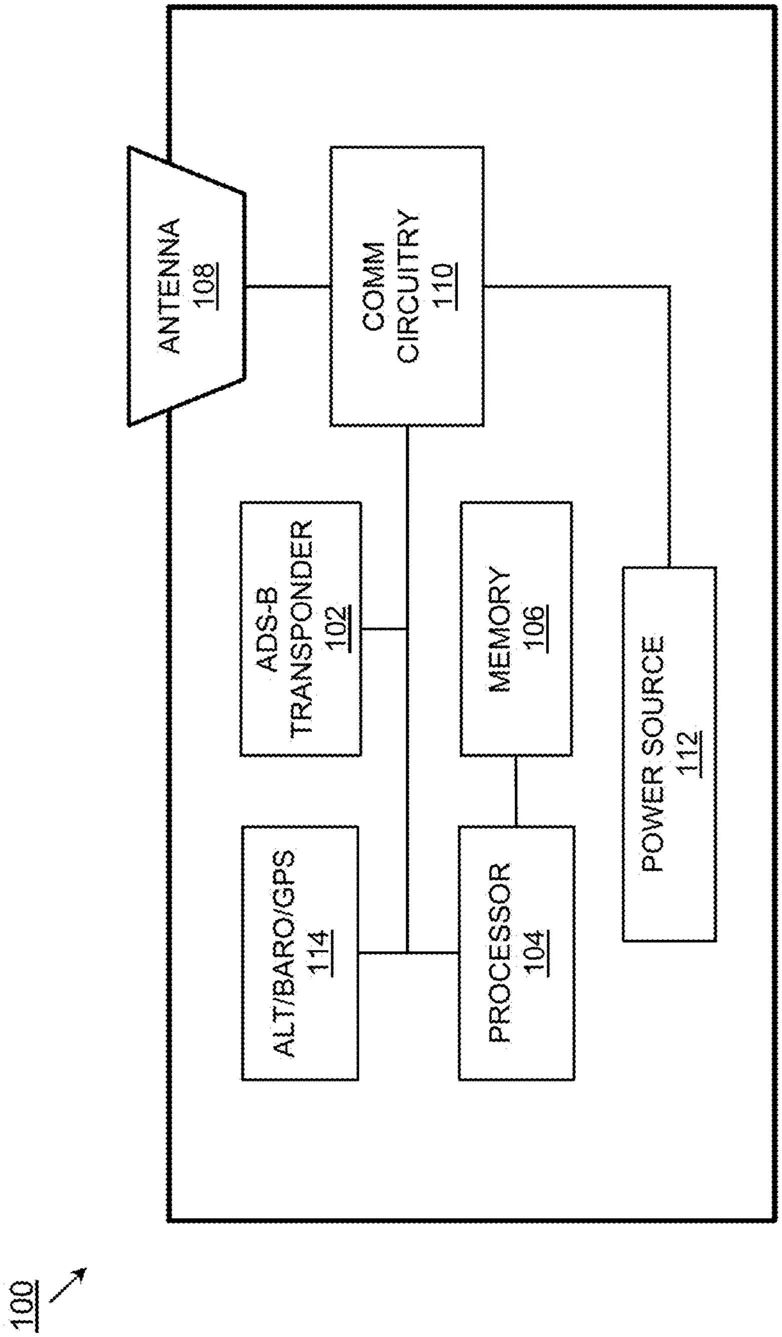
FIG. 1 is a simplified schematic illustrating a guidance system 100 for a UAS in accordance with one or more embodiments of the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, la, 1*b*). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly speaking, embodiments of the inventive concepts disclosed herein are directed generally to systems and methods for integrating unmanned aerial systems (UAS) into shared airspace. In order to optimize the limited spectral capacity of communications networks within which the UAS operate along with other manned aircraft, communications signals transmitted by some aircraft (e.g., by one or more UAS) may be received only by relevant aircraft or ground-based stations. For example, to avoid interference, transmissions by a UAS operating in Class G airspace may not be receivable by a commercial aircraft operating in Class A airspace.

Referring to FIG. 1, an exemplary embodiment of a system 100 for regulating the location of a UAS may include a transponder 102, a processor 104 and non-transitory memory unit 106, antenna element 108, communication circuitry 110, and a power source 112. The power source 112 may be a battery or any appropriate type of power supply suitable for mounting onboard a UAS. The antenna element 108 may include any combination of directional and omnidirectional elements. The transponder 102 and communication circuitry 110 may be configured for generating and receiving (via the antenna element 108) position signals including, but not limited to, ADS-B compatible signals or Mode-A, Mode-C, or Mode-S transponder signals. For example, the processors 104 may direct the communication circuitry 110 to transmit and receive ADS-B Out signals. The processors may decode inbound ADS-B signals from nearby aircraft and other vehicles, analyzing and storing the resulting ADS-B data to memory 106. The memory device 106 may include, but is not limited to, an Electrically Erasable Programmable Read Only Memory (EEPROM) device and the processors 104 may include, but are not limited to, a microcontroller unit (MCU). The ADS-B transponder 102, communication circuitry 110 and antenna element 108 may be configured to transmit and receive data on any ADS-B frequency bands including, but not limited to, 978 MHz Universal Access Transceiver (UAT) signals or 1090 MHz extended squitter (ES) signals.

The system 100 may include one or more onboard position sensors 114, such as a barometer, altimeter, or Global Navigation Satellite System (GNSS) receiver. For example, the GNSS receiver may determine a current position of the UAS based on navigational signals received from navigational satellites. In some embodiments, the UAS may not include onboard position sensors and the transponder 102 may receive ADS-B Out or similar position signals from other aircraft. The processors 104 may decode the inbound signals and derive, based on the resulting position information and the transmission and reception times of the received signals, accurate positions of the transmitting aircraft, and accurate distances thereto, from the ownship in which the system 100 is embodied. Based on received position signals from as few as two proximate aircraft, the processors 104 may derive an accurate ownship position of the UAS. Position data, whether received by the UAS or derived by the processors 104, may include a latitude, longitude, or altitude. Position data based on multiple position signals received from a single aircraft may include a heading and velocity of the aircraft.

Figure 2:
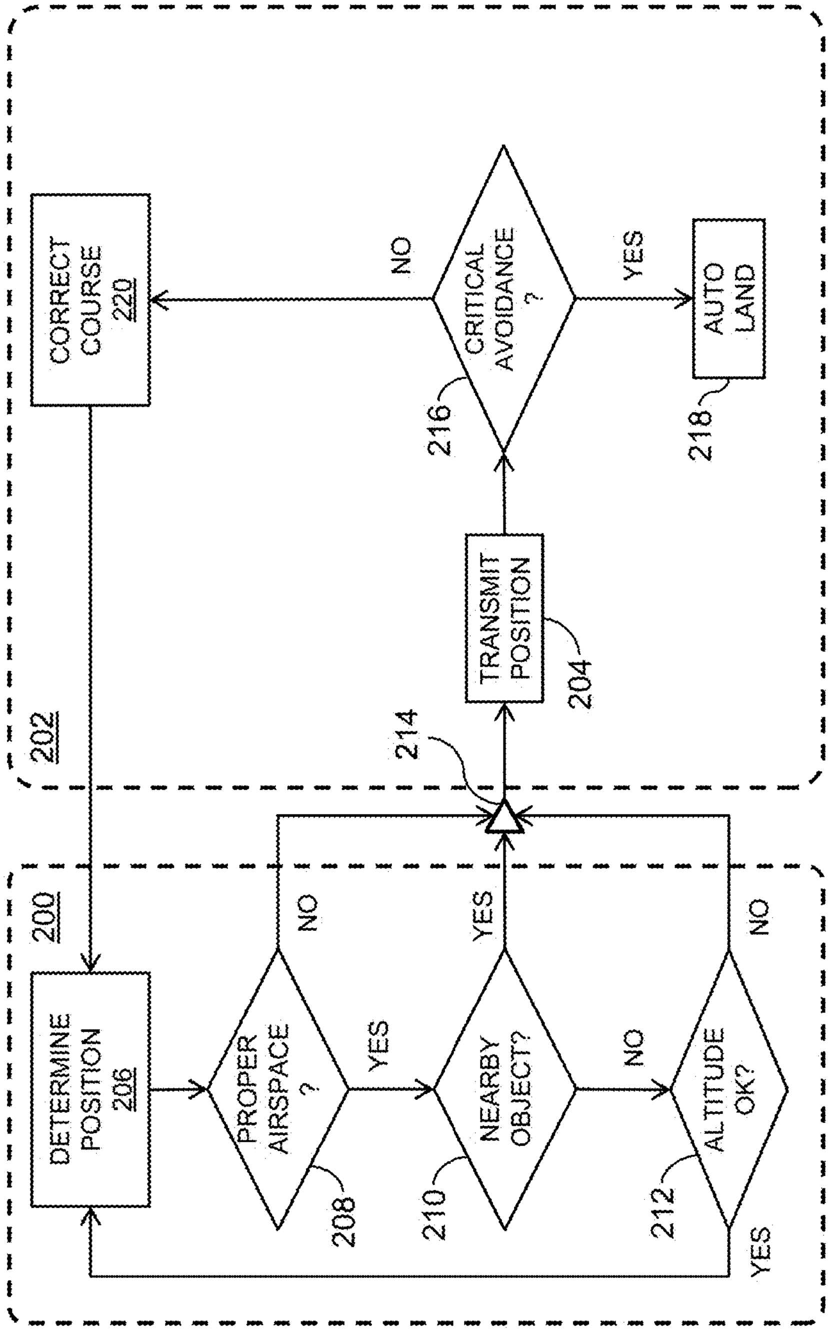
FIG. 2 is a flow diagram illustrating operations of the guidance system of FIG. 1.

FIG. 2 is a flow diagram illustrating operations of the system 100 of FIG. 1. The system 100 may operate in an "inert" mode (200), wherein the system 100 does not transmit the determined position of the UAS, and an "alert" mode (202), wherein the determined position is broadcast via the transponder 102, communications circuitry 110, and antenna element 108 (FIG. 1). When in the "alert" mode 202, the transponder 102 may broadcast (204) a position signal corresponding to the current determined position of the UAS (encoded by the processors 104) at a predetermined interval, e.g., at a frequency of 1 Hz. The system 100 may default to the "alert" mode 202 when the UAS is integrated into a shared airspace, within which the position of the UAS must continually be made available to air traffic or traffic control facilities. Alternatively, the system 100 may default to the "inert" mode 200 in situations wherein the efficient use of spectral capacity of the communications networks within which the UAS operates may be desired. For example, the UAS may operate within a segregated airspace at an altitude below 500 feet AGL, wherein ADS-B signals from multiple UAS may generate interference for civil or commercial aircraft near the segregated airspace. Accordingly, the UAS may broadcast ADS-B signals only when leaving the segregated airspace, so that other aircraft are properly alerted to its location, or when an alert condition or problem status is detected.

In one embodiment the system 100 may determine (206) the current position of the UAS. As previously noted, the system 100 may determine the current position of the UAS via onboard position sensors, by deriving ownship position information from position signals transmitted by other aircraft, or by any other method known in the art. The system 100 may continually evaluate the current status of the UAS based on the current position of the UAS. Any deviations or irregularities in the status of a UAS operating in the "inert" mode (200) may result in a problem status, the detection of which may activate the "alert" mode (202). For example, the system 100 may determine (208) whether the UAS is operating within the proper airspace (e.g., Class G airspace), based on, e.g., the altitude of the UAS. The system 100 may determine (210) whether any other aircraft, vehicles, or obstacles are proximate to the UAS or to its flight plan, based on the determined position of the UAS and, e.g., the positions of source aircraft from which the UAS derives its ownship position. The system 100 may determine (212) whether the UAS is operating at an acceptable altitude (e.g., below 500 feet AGL or the ceiling of its segregated airspace). The system 100 may perform other determinations (not shown) according to the flight plan of the UAS, or based on other transmissions received by the transponder 102. If all determinations (208, 210, 212) result in acceptable statuses, the system 100 may continue monitoring in the "inert" mode 200 (e.g., by returning to step 206 and determining a new current position of the UAS). If any determinations result in an unacceptable status or a problem status (e.g., a potential collision, near-miss, or encroachment of a restricted airspace), the system 100 may activate (214) the "alert" mode 202 and direct the UAS to take evasive action to resolve any identified problem status.

Upon activation of the "alert" mode 202, the system 100 may broadcast (204) the determined position of the UAS via, e.g., ADS-B Out signals transmitted by the transponder 102. For example, if the UAS has been operating in "inert" mode (200) and has not been broadcasting its position at intervals, the system 100 may begin doing so at a predetermined interval. The system 100 may analyze (216) any identified problem status to determine whether the problem status is a critical problem warranting critical avoidance measures (e.g., auto-landing procedures). For example, the current position of the UAS may lie within an airspace under Temporary Flight Restriction (TFR) or other geo-fenced airspace barring incursion by a UAS, or the UAS may be under imminent threat of collision or near-miss with a detected proximate aircraft of higher priority (e.g., another UAS or a manned aircraft such as a helicopter). Should the system 100 determine that critical avoidance measures are necessary, the system may direct (218) the control system of the UAS to execute auto-landing of the UAS. The UAS may be preprogrammed with multiple auto-landing protocols; depending on the current position of the UAS and any other available environmental information, the system 100 may direct the UAS to land as soon as is practical, land as soon as is possible, or land immediately without regard to other factors such as the integrity of the UAS. If an identified problem status is determined not to be critical, the system 100 may correct the course (220) of the UAS, e.g., by directing the control system of the UAS to adjust the position, velocity, heading, or rotational orientation of the UAS. The system 100 may continue to determine the position (206) of the UAS to assess if the status of the UAS is once again acceptable; if no problem status is detected, the system may continue in the "alert" mode 202 or revert to "inert" mode 200 if, e.g., the UAS is operating in a segregated airspace as described above.

Figure 3:
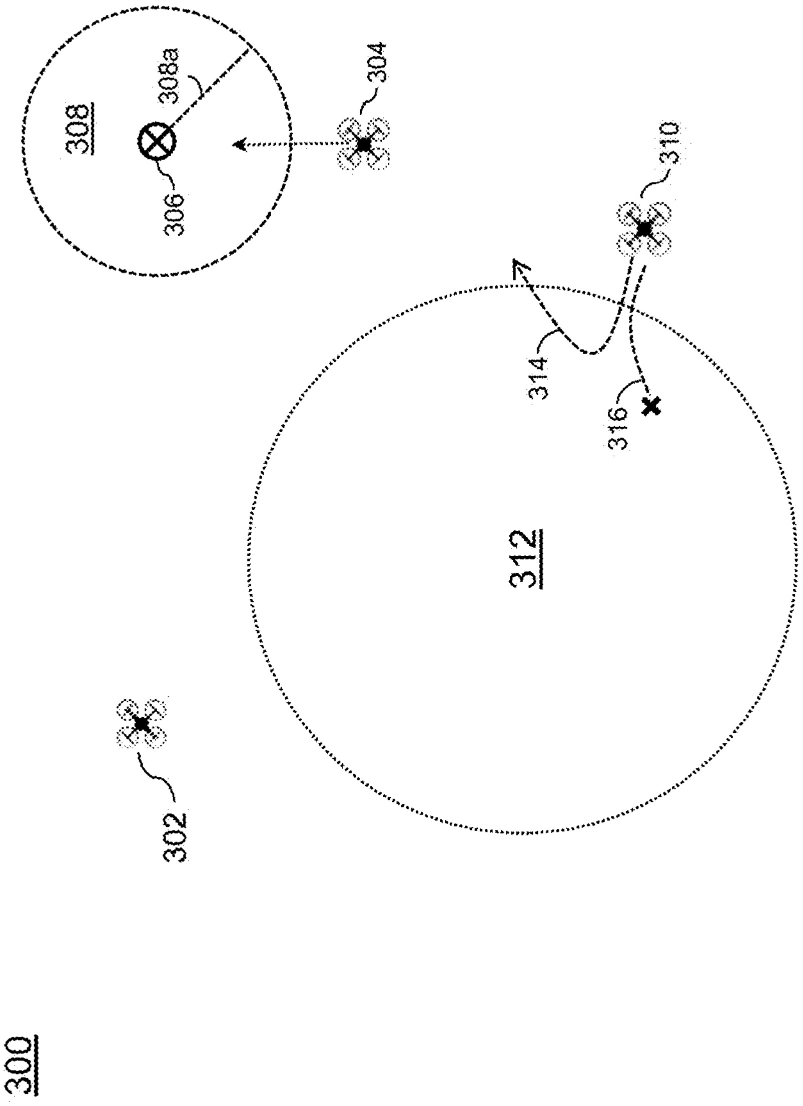
FIG. 3 is a simplified diagram illustrating the evaluation of an airspace by the system of FIG. 1.

FIG. 3 illustrates the evaluation of an airspace 300 by the system 100 of FIG. 1 according to embodiments of the inventive concepts disclosed herein. In one embodiment, the airspace 300 may be an allowable airspace within which a UAS 302 is authorized to operate. The UAS 302 may operate within the allowable airspace 300 in the "inert" mode (200, FIG. 2). Accordingly, the UAS 302 may not transmit its position via ADS-B Out signals while operating in the allowable airspace 300. In another embodiment, a UAS 304 operating in the "inert" mode 200 may approach a high priority object 306 (e.g., a manned aircraft, helicopter, or ADS-B ground station). Should the UAS 304 encroach upon the airspace 308 defined by a radius 308*a* around the high priority object 306, the system 100 of the UAS 304 may detect the high priority object 306 and activate the "alert" mode (202, FIG. 2). Upon activation of the "alert" mode 202, the system 100 of the UAS 304 may begin transmission of ADS-B signals indicating the position of the UAS 304; the transmitted ADS-B signals may include other information such as a unique identifier of the UAS 304. The high priority object 306 may be alerted to the location of the UAS 304 via ADS-B signals transmitted from the UAS 304. The system 100 of a UAS 310 may be configured to avoid airspaces corresponding to airports, ADS-B ground stations, or other restricted locations within a predetermined radius. For example, the locations of known TFRs and geofenced areas proximate to the flight path of the UAS 310 may be preloaded to the memory 106 (FIG. 1) of the system 100; the system 100 may compare the current position of the UAS 310 with known geofenced locations while determining the current status of the UAS. Should an airspace 312 represent a restricted or proscribed airspace (e.g., under a TFR or other type of geofence), the system 100 may direct the UAS 304 to correct course (314) or auto-land (316).

Figure 4:
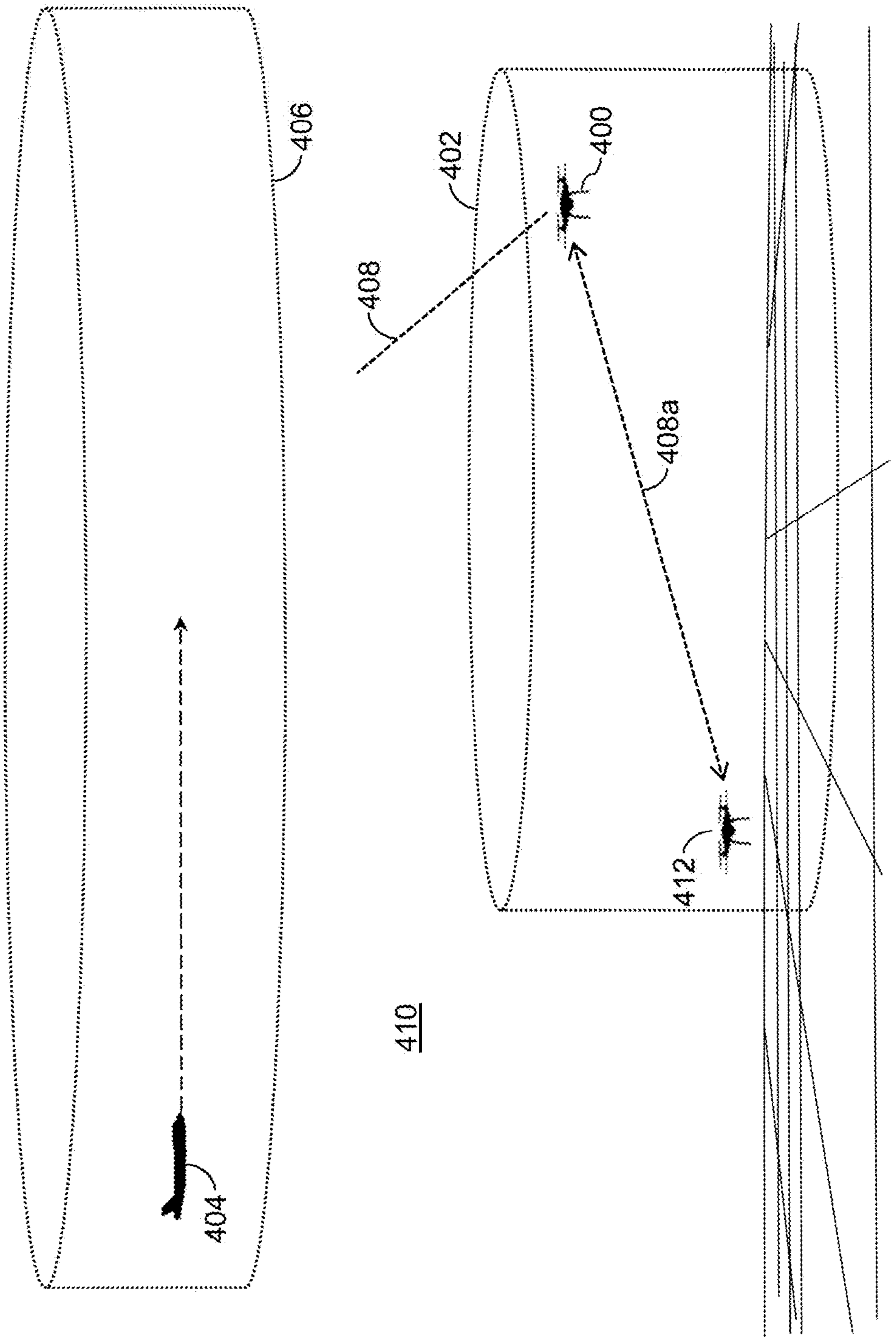
FIG. 4 is a diagram illustrating the separation of the UAS of FIG. 3 relative to a commercial aircraft operating in a segregated airspace.

Referring to FIG. 4, the UAS 400 may be implemented and may function similarly to the UAS 304, 306, 310 of FIG. 3, except that the UAS 400 may operate in a first segregated airspace 402 relative to a commercial aircraft 404 operating within a second segregated airspace 406. In some applications, it may be desirable that ADS-B signals transmitted by the UAS 400 (e.g., while in the "alert" mode (200, FIG. 2)) not be received by, and thus not generate interference for, the commercial aircraft 404 in the second segregated airspace 406. Whether the commercial aircraft 404 may detect an ADS-B signal 408 transmitted by the UAS 400 may depend on one or more variables such as the transmission power of the ADS-B transponder (102, FIG. 1) of the UAS 400, the sensitivity of ADS-B receivers aboard the commercial aircraft 404, or the separation between the UAS 400 and commercial aircraft 404. For example, the transmission power of the ADS-B transponder 102 of the UAS 400 may be modulated such that transmitted ADS-B signals are sufficiently attenuated during propagation (408) so as not to be received aboard the commercial aircraft 404.

By way of a non-limiting example, the second segregated airspace 406 (wherein the commercial aircraft 404 operates) may be defined above 2,000 feet AGL and the first segregated airspace 402 (wherein the UAS 400 operates) may be defined below 500 feet AGL. The first and second segregated airspaces 402, 406 may thus be separated by a buffer zone 410 of at least 1,500 feet. Furthermore, the commercial aircraft 404 may have a minimum receiver sensitivity of −80 dBm, defining the minimum power of a detectable ADS-B signal (408). If the free space propagation loss (FSPL) at the transmission frequency of the ADS-B transponder 102 of the UAS 400 (e.g., 1090 MHz) is 85 dB at a distance of 1,500 feet, the ADS-B transponder 102 may transmit ADS-B signals (408) at or below 5 dBm without the signals 408 being detected by the commercial aircraft 404. In one embodiment, the receiver sensitivity of the ADS-B transponder 102 aboard the UAS 400 may be set higher than that of remote aircraft (e.g., the commercial aircraft 404) to enable efficient communication between the UAS 400 and other UAS (412) within the first segregated airspace 402. For example, if the receiver sensitivity of the ADS-B transponders 102 aboard the UAS 400, 412 is set to −103 dBm and transmission power is set to 5 dBm, the UAS 400, 412 may communicate via bi-directional ADS-B transmissions (408*a*) over a distance of 3.75 miles within the first segregated airspace 402, without interference with (or detection by) the commercial aircraft 404 above 2,000 ft (with receiver sensitivity of −80 dBm).

Figure 5:
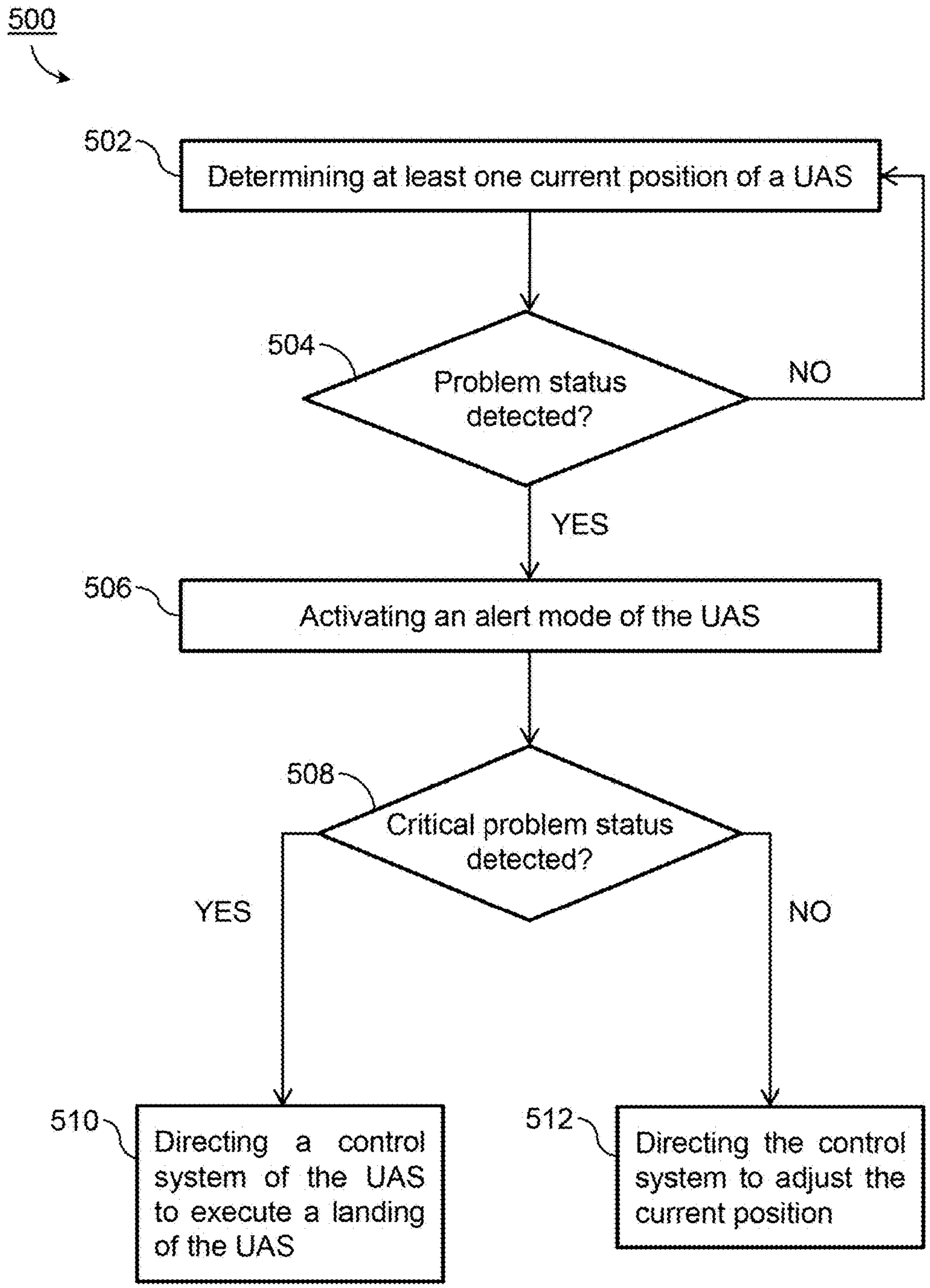
FIG. 5 is a flow diagram illustrating an exemplary embodiment of a method in accordance with one or more embodiments of the inventive concepts disclosed herein.

Referring to FIG. 5, an exemplary embodiment of a method 500 according to the inventive concepts disclosed herein may be implemented by the system 100 of FIG. 1 and may include the following method steps.

At a step 502, the system 100 may determine the current position of the UAS within which the system 100 is embodied. For example, the determined position may include a current latitude, a current longitude, a current altitude, a current heading, a current velocity, or a current rotational orientation. The current position may be determined by onboard position sensors, or by receiving position signals (e.g., ADS-B Out signals) transmitted by at least two source vehicles, determining the positions of the source vehicles and the distances thereto based on the propagation times of the received signals, and determining the current position of the UAS based on the determined distances.

At a step 504, the system 100 detects one or more problem statuses of the UAS based on the determined position. For example, based on a determined position of the UAS, the system may determine that the UAS is operating at an improper altitude or within an improper or restricted airspace, or the system may detect an object or vehicle proximate to the UAS.

At a step 506, if a problem status is detected, the system 100 activates the alert mode 200 of the UAS. The ADS-B transponder 102 of the UAS may broadcast the determined position of the UAS via ADS-B Out transmission. For example, the ADS-B Out signal broadcast by the UAS may be a 978 MHz UAT signal or a 1090 MHz ES signal.

At a step 508, the system 100 determines if an identified problem status is a critical problem status.

At a step 510, if a critical problem status is identified, the system 100 directs the UAS to auto-land.

At a step 512, if no critical problem status is detected, the system 100 directs the UAS to resolve the problem status (e.g., exit the restricted airspace, avoid the detected vehicle) by changing the course of the UAS.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

I claim:

1. A system for regulating the location of an unmanned aerial system (UAS), comprising:

at least one processor disposed aboard a UAS and configured to:

determine at least one current position of the UAS;

detect at least one problem status of the UAS based on the determined current position, the problem status associated with at least one of a proximate aircraft, an improper altitude, and an improper airspace;

if the at least one problem status is detected, activate an alert mode of the UAS;

determine if the detected problem status is a critical status;

in response to a determined critical status, direct a control system of the UAS to execute a landing of the UAS; and if the alert mode is activated and no critical status is determined, direct the control system to adjust the current position; and at least one transponder coupled to the processor, the transponder including at least one antenna element and communication circuitry configured to:

generate at least one first position signal based on the current position;

receive at least one second position signal via the antenna element, the second position signal associated with the proximate aircraft; and if the alert mode is active, transmit the at least one first position signal via the antenna element to at least one of the proximate aircraft and a traffic control facility.

2. The system of claim 1, further comprising:

at least one position sensor coupled to the processor and configured to determine the at least one current position.

3. The system of claim 2, wherein the at least one position sensor includes at least one of:

a barometer;

an altimeter; and a position receiver configured to determine the current position based on at least one third position signal received from a navigational satellite.

4. The system of claim 1, wherein the current position includes at least one of a current latitude of the UAS, a current longitude of the UAS, a current altitude of the UAS, a current heading of the UAS, a current velocity of the UAS, and a current rotational orientation of the UAS.

5. The system of claim 1, wherein the first position signal and the second position signal include at least one of:

a 978 MHz UAT signal;

a 1090 MHz ES signal;

a Mode-S transponder signal;

a TCAS signal; and an ADS-B signal.

6. The system of claim 1, wherein:

the at least one second position signal includes at least one of a fourth position signal received from a second aircraft and a fifth position signal received from a third aircraft; and the processor is configured to:

determine at least one first distance to the second aircraft based on the at least one fourth position signal; and determine at least one second distance to the third aircraft based on the at least one fifth position signal; and determine the current position based on at least the first distance and the second distance.

7. The system of claim 1, wherein the UAS is a first UAS and the at least one proximate aircraft includes one or more of a manned aircraft and a second UAS.

8. An unmanned aerial system (UAS), comprising:

a control system configured to adjust at least one position of the UAS;

at least one processor coupled to the control system and configured to:

determine the at least one position;

detect at least one problem status of the UAS based on the at least one position, the problem status associated with at least one of a proximate aircraft, an improper altitude, and an improper airspace;

if the at least one problem status is detected, activate an alert mode of the UAS;

determine if the detected problem status is a critical status;

in response to a determined critical status, direct the control system to execute a landing of the UAS; and if the alert mode is activated and no critical status is determined, direct the control system to adjust the at least one position; and at least one transponder coupled to the processor, the transponder including at least one antenna element and communication circuitry configured to:

generate at least one first position signal based on the at least one position;

receive at least one second position signal via the antenna element, the second position signal associated with the proximate aircraft; and if the alert mode is activated, transmit the at least one first position signal via the antenna element to at least one of the proximate aircraft and a traffic control facility.

9. The UAS of claim 8, further comprising:

at least one position sensor coupled to the processor and configured to determine the at least one position.

10. The UAS of claim 9, wherein the position sensor includes at least one of:

a barometer;

an altimeter; and a position receiver configured to determine the current position based on at least one third position signal received from a navigational satellite.

11. The UAS of claim 8, wherein:

the at least one second position signal includes at least one of a fourth position signal received from a second aircraft and a fifth position signal received from a third aircraft; and the processor is configured to:

determine at least one first distance to the second aircraft based on the at least one fourth position signal; and determine at least one second distance to the third aircraft based on the at least one fifth position signal; and determine the current position based on at least the first distance and the second distance.

12. The UAS of claim 8, wherein the first position signal and the second position signal include at least one of:

a 978 MHz UAT signal;

a 1090 MHz ES signal;

a Mode-S transponder signal;

a TCAS signal; and an ADS-B signal.

13. The UAS of claim 8, wherein the at least one position includes at least one of a current latitude of the UAS, a current longitude of the UAS, a current altitude of the UAS, a current heading of the UAS, a current velocity of the UAS, and a current rotational orientation of the UAS.

14. The UAS of claim 8, wherein the UAS is a first UAS and the at least one proximate aircraft includes one or more of a manned aircraft and a second UAS.

15. A method for regulating the location of an unmanned aerial system (UAS), comprising:

determining, on board a UAS, at least one current position of the UAS;

detecting, on board the UAS, at least one problem status of the UAS based on the current position, the problem status associated with at least one of a proximate aircraft, an improper altitude, and an improper airspace;

in response to the at least one detected problem status, activating an alert mode of the UAS;

in response to the activated alert mode, transmitting an encoded position signal based on the current position to at least one of the proximate aircraft and a traffic control facility via a transponder of the UAS;

determining if the at least one problem status includes a critical problem status;

in response to the at least one determined critical problem status, directing a control system of the UAS to execute a landing of the UAS;

if the alert mode is activated and no critical problem status is determined, directing the control system to adjust the current position.

16. The method of claim 15, wherein determining at least one current position of a UAS includes:

receiving, via a receiver of the UAS, at least one first position signal transmitted by a first vehicle;

receiving, via the receiver, at least one second position signal transmitted by a second vehicle;

determining at least one first distance between the UAS and the first vehicle based on the first position signal;

determining at least one second distance between the UAS and the second vehicle based on the second position signal; and determining the at least one current position based on two or more of the at least one first distance and the at least one second distance.

17. The method of claim 15, wherein determining at least one current position of a UAS includes:

determining at least one of a current latitude of the UAS, a current longitude of the UAS, a current altitude of the UAS, a current heading of the UAS, and a current rotational orientation of the UAS.

18. The method of claim 15, wherein transmitting an encoded position signal based on the current position to at least one of the proximate aircraft and a traffic control facility via a transponder of the UAS includes:

transmitting the at least one current position via at least one of a 978 MHz UAT signal, a 1090 MHz ES signal, and an ADS-B Out signal.

19. The method of claim 15, wherein the UAS is a first UAS and transmitting an encoded position signal based on the current position to at least one of the proximate aircraft and a traffic control facility via a transponder of the UAS includes:

transmitting the encoded position signal to at least one of a manned aircraft and a second UAS.

* * * * *